United States Patent
McEnhill et al.

(10) Patent No.: US 6,831,124 B2
(45) Date of Patent: Dec. 14, 2004

(54) THERMOPLASTIC RESIN COMPOSITION

(75) Inventors: Corey S. McEnhill, Dublin, OH (US);
Bryan T. Cerra, Hilliard, OH (US);
Yoshiyuki Ito, Kawachi-Machi (JP);
Kazuhiko Masuda, Ichihara (JP);
Youichi Kawai, Troy, OH (US);
Shigemi Sakumoto, Sidney, OH (US);
Hiroyuki Toshino, Tipp City, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 189 days.

(21) Appl. No.: 09/836,534

(22) Filed: Apr. 18, 2001

(65) Prior Publication Data

US 2002/0183434 A1 Dec. 5, 2002

(51) Int. Cl.$^7$ .................................................. C08K 3/34
(52) U.S. Cl. ........................ 524/451; 524/426; 525/323
(58) Field of Search ................................ 524/451, 426, 524/427, 525; 525/323, 322, 324

(56) References Cited

U.S. PATENT DOCUMENTS

| 4,504,617 A | * | 3/1985 | Yamamoto et al. | ......... 524/451 |
| 4,734,459 A | | 3/1988 | Cecchin et al. | ............. 525/247 |
| 5,773,515 A | | 6/1998 | Srinivasan et al. | ......... 525/240 |
| 5,777,020 A | | 7/1998 | Nagai et al. | ................. 524/451 |
| 5,985,971 A | | 11/1999 | Srinivasan et al. | ......... 524/425 |
| 5,998,524 A | | 12/1999 | Srinivasan et al. | ......... 524/425 |
| 6,087,429 A | * | 7/2000 | Yamamoto et al. | ......... 524/451 |

FOREIGN PATENT DOCUMENTS

EP   0 739 940   10/1996   ........... C08L/23/12

* cited by examiner

Primary Examiner—Edward J. Cain
Assistant Examiner—Katarzyna Wyrozebski Lee
(74) Attorney, Agent, or Firm—Kilyk & Bowersox, P.L.L.C.; Mark E. Duell, Esq.

(57) ABSTRACT

This invention relates to a thermoplastic resin composition containing: (a) about 85 to about 95 weight % of a crystalline propylene ethylene block copolymer or a combination of crystalline propylene ethylene copolymer and a propylene homopolymer whose (i) ethylene content ranges from about 2.2 to about 4.2 weight %, (ii) melt flow rate ranges from about 20 to about 30 g/10 minutes, and (iii) isotactic/pentad fraction of propylene homopolymer is greater than or equal to about 94%; (b) about 2 to about 8 weight % ethylene butene rubber whose melt flow rate ranges from about 6 to about 8 g/10 minutes and density ranges from about 0.860 to about 0.865 g/cc and (c) about 2 to about 8 parts by weight talc with an average diameter ranging from about 1 to about 2 $\mu$m. The thermoplastic resin composition is lightweight but maintains good rigidity and heat resistance properties. The thermoplastic resin may be molded into an article, such as those used as parts for an automobile interior.

23 Claims, No Drawings

THERMOPLASTIC RESIN COMPOSITION

THE TECHNICAL FIELD

This invention relates to a thermoplastic resin composition. Specifically, it relates to lightweight thermoplastic resin compositions that possess superior rigidity, heat resistance and other desirable characteristics. The thermoplastic resin composition is useful as molding material to form molded articles such as those used as interior automobile parts.

BACKGROUND

In recent years, the automobile industry has been examining ways to reduce vehicle weight to improve fuel efficiency, which in turn reduces the carbon dioxide emissions that negatively impact the global environment. To reduce vehicle weight, the automobile industry has focused on various automobile parts, including interior parts, which are often molded from compositions containing thermoplastic resins. These thermoplastic resin compositions typically contain fillers, such as talc, mica, or various fibers, which also tend to be the heaviest components of the resin. Although these fillers increase the overall weight of the resin composition, they also provide the molded part with the desired rigidity and heat resistance properties. Consequently, simply reducing the quantity of filler to reduce weight often results in low, unsatisfactory rigidity and heat resistance standards in the molded part. Accordingly, achieving weight reduction by reducing filler quantity has generally been considered unacceptable.

Various thermoplastic resins have been suggested, such as those found in U.S. Pat. Nos. 5,998,524; 5,985,971; 5,777,020; and 5,773,515. However, all those resins contain octene. Additionally, U.S. Pat. No. 4,734,459 discloses a polypropylene composition containing polypropylene with an isotacticity index of >90 and an ethylene/butene-1 polymeric mixture. However, this composition exhibits poor heat resistance.

To reduce weight, Japanese patent application 5-279526 discloses resin compositions consisting of specific crystalline propylene/ethylene block copolymer, fibrous inorganic filler, talc, olefin elastomer and/or styrene elastomer. According to Japanese Patent Application 5-279521, such a resin composition provides a lightweight, high-quality resin composition that maintains sufficient rigidity, heat resistance and other physical properties, while achieving a significantly lower specific gravity and a good external appearance.

However, resin compositions such as in Japanese Patent Application 5-279526 require expensive filler materials, adding to already-expensive manufacturing costs. Thus, there still remains a need in the art to create an economical, lightweight, high-quality thermoplastic resin composition that maintains necessary physical properties such as rigidity and heat resistance. This invention answers that need.

SUMMARY OF THE INVENTION

In one embodiment, the invention relates to a thermoplastic resin composition. The composition contains (a) a crystalline propylene ethylene block copolymer or a combination of crystalline propylene ethylene copolymer and a propylene homopolymer whose (i) ethylene content ranges from about 2.2 to about 4.2 weight %, (ii) melt flow rate at 230° C. under a 2.16-kg load ranges from about 20 to about 30 g/10 minutes, and (iii) isotactic/pentad fraction of propylene homopolymer, as measured by $^{13}$C-NMR, is greater than or equal to about 94%. The composition also contains (b) ethylene butene rubber whose melt flow rate ranges from about 6 to about 8 g/10 minutes and density ranges from about 0.860 to about 0.865 g/cc and (c) talc with an average diameter ranging from about 1 to about 2 $\mu$m. Constituent (a) is present in the composition from about 85 to about 95 weight %. Constituent (b) ranges from about 2 to about 8 weight %. Constituent (c) ranges from about 2 to about 8 parts by weight.

In a second embodiment, the invention relates to a molded thermoplastic resin composition of the thermoplastic resin composition described above. In a third embodiment, the invention relates to a process of preparing a molded thermoplastic resin, comprising the steps of filling a molder with a thermoplastic resin composition as described above, and curing the molded thermoplastic resin composition to form a molded article.

DETAILED DESCRIPTION

This invention relates to thermoplastic resin compositions that contain (a) a crystalline propylene ethylene block copolymer or a combination of a crystalline propylene ethylene copolymer block and propylene homopolymer, (b) an ethylene butene rubber; and (c) talc. The thermoplastic resin composition is lightweight while possessing good rigidity and heat resistance. These properties yield a high quality thermoplastic composition having a significantly lower specific gravity to achieve lightness while maintaining strength and durability. It is these properties which are most desirable in molded articles, particularly molded parts used in automobile interiors.

Possessing these desirable properties, a thermoplastic resin composition of the invention has a density of less than 0.94 g/cc, a flexural modulus of at least 20,000 kg/cm$^2$, an Izod impact strength of greater than 4.9 kg·cm/cm, a heat deflection temperature of at least 125° C., and a satisfactory showing (i.e., not breaking) under the Dupont impact strength test. In a preferred embodiment, a thermoplastic resin composition of the invention has a density of less than 0.94 g/cc, a flexural modulus of at least 21,800 kg/cm$^2$, an Izod impact strength of greater than 6.0 kg·cm/cm, a heat deflection temperature of at least 130° C., and a satisfactory showing (i.e., not breaking) under the Dupont impact strength test. In a more preferred embodiment, a thermoplastic resin composition of the invention has a density of less than 0.94 g/cc, a flexural modulus of at least 22,000 kg/cm$^2$, an Izod impact strength of greater than 6.0 kg·cm/cm, a heat deflection temperature of at least 130° C., and a satisfactory showing (i.e., not breaking) under the Dupont impact strength test.

The amount of constituents (a)–(c) is largely dictated by the physical properties desired in the final product, such as the rigidity, heat resistance, impact strength and overall weight of the thermoplastic resin composition. The amount of ethylene butene rubber constituent (b), is preferably high enough to achieve sufficient impact strength, but low enough to retain good rigidity and heat resistance properties. Additionally, the thermoplastic resin composition contains sufficient talc, constituent (c), to achieve sufficient rigidity and heat resistance properties, but low enough so that the talc will not significantly increase the specific gravity of the thermoplastic resin composition and consequently its total weight. The remainder of the thermoplastic resin composition is preferably made up of constituent (a), a crystalline propylene ethylene block copolymer or a combination of crystalline propylene ethylene block copolymer and propylene homopolymer.

In a preferred embodiment, the thermoplastic composition contains constituent (a) in an amount ranging from about 85 to about 95 weight %. The ethylene butene rubber, constituent (b), is present in an amount ranging from about 2 to about 8 weight %. The amount of the talc ranges from about 2 to about 8 weight %. More preferably, the amount of constituent (a) ranges from about 87 to about 93 weight %; the amount of the ethylene butene rubber, constituent (b), ranges from about 4 to about 7 weight %; and the amount of talc, constituent (c), ranges from about 4 to about 7 weight %. Most preferably, the amount of constituent (a) is 90 weight %; the amount of the ethylene butene rubber is 5 weight %; and the amount of the talc is 5 weight %.

The total weight percentage of the thermoplastic resin composition is 100 weight %. The ethylene butene rubber and talc constituents may or may not be present in equal portions.

As discussed above, the thermoplastic resin composition contains a crystalline propylene ethylene block copolymer or a combination of crystalline propylene ethylene copolymer and propylene homopolymer, constituent (a). The crystalline propylene ethylene block copolymer is a sequentially polymerized copolymer of a high crystallinity polypropylene and an ethylene propylene copolymer. To achieve the beneficial properties of the invention, the crystalline propylene ethylene block copolymer or a combination of crystalline propylene ethylene copolymer and propylene homopolymer, constituent (a), must meet three criteria. Constituent (a) has (i) an ethylene content ranging from about 2.2 to about 4.2 weight %; (ii) a melt flow rate at 230° C. under a 2.16-kg load, ranging from about 20 to about 30 g/10 minutes, and (iii), for a combination of crystalline propylene ethylene copolymer and propylene homopolymer, an isotactic/pentad fraction of propylene homopolymer, as measured by $^{13}$C-NMR, greater than or equal to about 94%. Crystalline propylene ethylene block copolymers and combinations of crystalline propylene ethylene copolymer and propylene homopolymer meeting these criteria are available from commercial suppliers.

With regard to criteria (i), the ethylene content of constituent (a) is preferably low enough to provide sufficient impact strength while high enough to retain good rigidity and heat resistance properties. Specifically, the ethylene content of the crystalline propylene ethylene block copolymer composition preferably ranges from about 2.2 to about 4.2 weight %. More preferably, the ethylene content ranges from about 2.2 to about 3.2 weight %. Most preferably, the ethylene content is 2.7 weight %. The ethylene content may be measured by procedures known to those of skill in the art. For example, ethylene content may be determined by infrared spectroscopy or by analyzing the absorption characteristics of the methyl base and methylene base using the calibration curve method.

The melt flow rate, criteria (ii) of constituent (a), is high enough to provide sufficient impact strength while low enough to provide good formability properties in the composition. Specifically, the melt flow rate of constituent (a) ranges from about 20 to about 30 g/10 minutes at 230° C. under a 2.16-kg load. More preferably, the melt flow rate ranges from about 21 to about 28 g/10 minutes and, most preferably, is 25 g/10 minutes.

When constituent (a) is a combination of a crystalline propylene ethylene copolymer and propylene homopolymer, the crystalline propylene ethylene block copolymer composition and the propylene homopolymer may be blended together in advance; i.e., before the ethylene butene rubber and talc have been added. Alternatively, the propylene homopolymer may be added to the crystalline propylene ethylene block copolymer composition after the ethylene butene rubber and talc have been added.

With regard to criteria (iii), the propylene homopolymer may be used in constituent (a) to increase rigidity and heat resistance properties of the thermoplastic resin composition. In such an embodiment, the propylene homopolymer has an isotactic/pentad fraction of 94% or greater, as measured by $^{13}$C-NMR. More preferably, this isotactic/pentad fraction is 97% or greater. An isotactic/pentad percentage is a good indicator of a composition's rigidity and heat resistance properties.

Constituent (b) of the thermoplastic polymer composition is an ethylene butene rubber. The ethylene butene rubber has a melt flow rate which provides good surface impact strength at low temperatures. Specifically, the flow rate of the ethylene butene rubber ranges from about 5 to about 10 g/10 minutes measured at 230° C. under a 2.16-kg load. More preferably, the melt flow rate ranges from about 6 to about 8 g/10 minutes. Most preferably, the melt flow rate is 7 g/10 minutes.

The density of the ethylene butene copolymer should be high enough to allow for sufficient heat resistance and low enough to retain good impact strength. The density of the ethylene butene rubber preferably ranges from about 0.860 g/cc to about 0.865 g/cc. More preferably, the density ranges from about 0.861 g/cc to about 0.863 g/cc. Most preferably, the density is 0.862 cc.

As is known in the art, copolymers of ethylene and butene used as rubbers are typically produced using a catalyst. Preferably, a metallocene catalyst is used. The ethylene butene rubber has butene as the α-olefin. Using butene as the α-olefin allows the ethylene butene rubber to exhibit important properties related to the desired weight and rigidity features of the thermoplastic resin composition. Preferably, the butene content of the rubber is about 33 wt %, and the molecular weight distribution ($M_w/M_n$) is less than about 2, where $M_w$ is the average molecular weight and $M_n$ is the number average molecular weight. Suitable ethylene butene rubbers are available from commercial suppliers.

Constituent (c) of the thermoplastic resin is talc. Any commercially available talc may be used. Before the talc is added to the thermoplastic resin composition, it may be treated with various surface treatment agents, such as organic titanate coupling agents, silane coupling agents, fatty acids, metal salts of fatty acids, fatty acid esters, and the like. The talc may also be added to the thermoplastic composition without surface treatments.

The particle size of the talc should be small enough to provide sufficient mechanical strength to the thermoplastic resin composition but not so large that the talc will coagulate causing lower impact strength. The average particle diameter of the talc ranges from about 1 μm to about 2 μm. More preferably, the average particle diameter is 1.5 μm. The average particle diameter may be measured according to known methods in the art. For example, the talc may be (a) processed in a centrifuge, and (b) analyzed from optical particle-size distributions using the centrifugal settlement method.

The thermoplastic resin composition may be further blended with small quantities of other adjuvants known in the art for use in thermoplastic resin compositions and molded articles. These adjuvants include, but are not limited to, coloring agents, pigments, nucleating agents, stabilizers such as antioxidants or photostabilizers, antistatic agents, dispersing agents, mold-release agents, and copper inhibitors.

The constituents of the thermoplastic resin may be blended or mixed together using methods known in the art to prepare thermoplastic resin compositions. Preferably, the constituents of the thermoplastic resin are blended together to form a blended composition and then granulated into pellets.

The blending step may be performed by any method known in the art. The blending step should, at least minimally, disperse the constituents amongst each other. The constituents may be blended together in a one-step process or a multiple-step process. In the one-step process, all the constituents are blended together at the same time. In the multiple-step process, two or more constituents are blended together to form a first mixture and then one of more of the remaining constituents are blended with the first mixture. If one or more constituents still remain, these constituents may be blended in subsequent blending steps. Preferably, all three constituents, (a)–(c), are blended together in one step. If adjuvants, such as stabilizers, coloring agents, nucleating agents, etc., as discussed above, are added, these adjuvants may be blended with the thermoplastic resin constituents in one step or first mixed with one or more constituents prior to the blending step. The adjuvants may be added individually or in a single step.

Certain portions of the constituents may also be blended at different steps for improved performance. For example, the crystalline propylene ethylene block copolymer—without propylene homopolymer—may be blended with the ethylene butene rubber to form a resin mixture. The resin mixture may then be blended with the talc and, if present, any adjuvants to form a second mixture. The second mixture may then be blended with the propylene homopolymer to form a thermoplastic resin composition of the invention. As discussed above, this is only one method to blend the constituents of the thermoplastic resin composition. Other blending and mixing techniques are known to those skilled in the art and may be used.

The granulation step may be performed by any method known in the art. For example, the granulation step may be performed using a general single/multi-axis extruding machine, such as a one-axis extruding machine or two-axis extruding machine. Preferably, a two-axis extruding machine is used for granulation. Granulation may include a kneading step, preferably performed in combination with the granulation. When the kneading step is present, the granulation may be performed using a general single/multi-axis extruding machine, and the kneading may be performed with a kneading machine, such as a banbury mixer, roller, or kneader.

Thermoplastic resin compositions of the invention may be molded to form molded articles. The composition may be molded by any method known in the art, such as injection molding, extrusion molding, hollow molding, sheet molding, heat forming, rotational molding, or laminate molding. Preferably, the thermoplastic resin composition is molded via injection molding.

For a typical injection molding method, the preferred barrel temperature ranges from 410° F./210° C. to 375° F./190° C. (for harder to fill parts, the temperatures may have to be increased), with the lower temperatures in the rear zones to allow venting through the hopper. The preferred melt temperature has a maximum temperature with a hand pyrometer ranging from 380° F. to 440° F. while the mold temperature typically ranges from 80° F. to 100° F. The injection pressure preferably ranges from 50 to 60% of machine capacity, but the pressure should be sufficient to fill the mold without hesitation or flashing. The holding pressure setting should be lower than boost pressure with a minimum amount of time to prevent over-packing of the part. It is preferred to use a slow to medium injection speed to prevent excessive shear on the material. The injection molding process preferably maintains a cushion at 10 to 20 mm to provide enough material for consistent parts. Decompression is preferably used only when necessary to prevent nozzle drool. With regard to screw speed (RPM), the screw should stop 1 to 2 seconds before mold opens—a lower RPM is preferred for mixing and uniform melt temperature. After the injection molding is complete, the molded article is preferably dried for a minimum of two hours at 100° C. (212° F.).

The thermoplastic resin composition may be molded into to any shape or form. Preferably, it is molded into parts that may be used in the interior of an automobile, such as a console, steering column cover, driver lower cover, column cover lower, column cover upper, side cover right, side cover left, center lower cover, center lower garnish, defroster duct, glove box, duct outlet, and tailgate lower.

The following examples illustrate thermoplastic resin compositions of this invention and their uses. The scope of the invention is not to be limited by these examples.

EXAMPLES

Example 1

The following constituents were blended together for one minute using a Henschel mixer: (a) 90 weight % of a crystalline propylene ethylene block copolymer and propylene homopolymer composition, having a melt flow rate of 25 g/10 minutes, ethylene content of 2.7 weight %, and an isotactic/pentad fraction of the propylene homopolymer of 97%; (b) 5 weight % of an ethylene butene rubber, having a melt flow rate of 7 g/10 minutes and density of 0.862 g/cc; (c) 5 weight % talc, having an average diameter of 1.5 µm; and (d) an antioxidant and photostabilizer. The blended composition was then granulated into pellets using a two-axis extruding machine.

Example 2

Example 2 was conducted under the same conditions and used the same materials as Example 1, except the isotactic/pentad percentage of the propylene homopolymer was 95%.

Comparative Example 3

Comparative Example 3 was conducted under the same conditions and used the same materials as Example 1, except the melt flow rate of the crystalline propylene ethylene block copolymer and propylene homopolymer composition was 40 g/10 minutes.

Example 4

Example 4 was conducted under the same conditions and used the same materials as Example 1, except the weight percentage of the ethylene content of the crystalline propylene ethylene block copolymer and propylene homopolymer composition was 4.0.

Comparative Example 5

Comparative Example 5 was conducted under the same conditions and used the same materials as Example 1, except the weight percentage of the ethylene content of the crystalline propylene ethylene block copolymer and propylene homopolymer composition was 2.0.

Comparative Example 6

Comparative Example 6 was conducted under the same conditions and used the same materials as Example 1, except that the melt flow rate of the ethylene butene rubber was 1 g/10 minutes and the density of the ethylene butene rubber was 0.861 cc.

Comparative Example 7

Comparative Example 7 was conducted under the same conditions and used the same materials as Example 1, except that the melt flow rate of the ethylene butene rubber was 65 g/10 minutes.

Comparative Example 8

Comparative Example 8 was conducted under the same conditions and used the same materials as Example 1, except that the density of the ethylene butene rubber was 0.871 cc.

Comparative Example 9

Comparative Example 9 was conducted under the same conditions and used the same materials as Example 1, except that an ethylene octene rubber was used in place of the ethylene butene rubber of Example 1. Also, the melt flow rate of the ethylene octene rubber was 10 g/10 minutes and the density of the ethylene octene rubber was 0.870 cc.

Comparative Example 10

Comparative Example 10 was conducted under the same conditions and used the same materials as Example 1, except that an ethylene propylene rubber was used in place of the ethylene butene rubber of Example 1. Also, the melt flow rate of the ethylene octene rubber was 8 g/10 minutes and the density of the ethylene octene rubber was 0.867 cc.

Comparative Example 11

Comparative Example 11 was conducted under the same conditions and used the same materials as Example 1, except that the average diameter of the talc was 3 $\mu$m.

Using these pellets, melt flow rate of the composition was evaluated under a 2.16-kg load at 230° C. in conformance with American Standard Testing Methods ("ASTM") D1238. A composition having a melt flow rate greater than 20 g/10 minutes was considered acceptable.

Then, test pieces were formed and their physical properties were evaluated using an injection molding machine with a clamping force of 100 tons. Special dies were used to form test pieces for measurement, and their physical properties were evaluated under the following conditions.

Density: Density was measured in conformance with ASTM-D792, to evaluate the lightness of the test piece. A composition having a density of less than 0.94 g/cc was considered acceptable.

Flexural modulus: Flexural modulus was measured at 23° C. in conformance with ASTM-D790, to evaluate the rigidity of the test piece. A composition having a flexural modulus of at least 20,000 kg/cm$^2$ is considered acceptable. A composition having a flexural modulus of greater than 21,800 kg/cm$^2$ is preferred. A composition having a flexural modulus of greater than 22,000 kg/cm2 is most preferred.

Izod impact strength: Impact strength was measured at 23° C. on pieces with molding notch, in conformance with ASTM-D256, to evaluate the impact resistance of the test piece. A composition having a Izod impact strength of greater than 4.9 kg·cm/cm is considered acceptable. A composition having an Izod impact strength of greater than 6.0 kg·cm/cm is preferred.

Dupont impact strength: A 2 mm thick, flat plate was sandwiched between a cylindrical pedestal with an inner diameter of 44 mm and outer diameter of 48 mm and a semispherical striker with a radius of 6.35 mm, and a 500 g weight was dropped onto it at −30° C. from a height of 20 cm, to check the fracture pattern. The result was deemed acceptable if no cracks or breaks occurred at the impact point, and deemed not acceptable if cracks or breaks occurred.

Heat deflection temperature: heat deflection temperature was measured under a load of 4.6 kg/cm$^2$ in conformance with ASTM-D648, to evaluate the heat resistance of the test piece. A composition having a heat deflection temperature of 125° C. was considered acceptable. A composition having a heat deflection temperature of 130° C. or greater was considered preferred.

TABLE 1

| | Constituent | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| a | No. | Isotacticity | MFR | Ethylene content | | | | | | | | | | |
| | A-1 | 0.97 | 25 | 2.7 | 90 | | | | | 90 | 90 | 90 | 90 | 90 | 90 |
| | A-2 | 0.95 | 25 | 2.7 | | 90 | | | | | | | | | |
| | A-3 | 0.97 | 40 | 2.7 | | | 90 | | | | | | | | |
| | A-4 | 0.97 | 25 | 4.0 | | | | 90 | | | | | | | |
| | A-5 | 0.97 | 25 | 2.0 | | | | | 90 | | | | | | |
| b | No. | Rubber Type | MFR | Density | | | | | | | | | | | |
| | B-1 | Ethylene Butene | 7 | 0.862 | 5 | 5 | 5 | 5 | 5 | | | | | | 5 |
| | B-2 | Ethylene Butene | 1 | 0.861 | | | | | | 5 | | | | | |
| | B-3 | Ethylene Butene | 65 | 0.862 | | | | | | | 5 | | | | |
| | B-4 | Ethylene Butene | 7 | 0.871 | | | | | | | | 5 | | | |
| | B-5 | Ethylene Octene | 10 | 0.870 | | | | | | | | | 5 | | |

TABLE 1-continued

| Constituent | | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| | B-6 | Ethylene Propylene | 8 0.867 | | | | | | | | | 5 | | |
| c | No. | Average Diameter ($\mu$m) | | | | | | | | | | | | |
| | C-1 | 1.5 | | 5 | 5 | 5 | 5 | 5 | 5 | 5 | 5 | 5 | 5 | |
| | C-2 | 3 | | | | | | | | | | | | 5 |
| Density (g/cc) | | | | 0.93 | 0.93 | 0.93 | 0.93 | 0.93 | 0.93 | 0.93 | 0.93 | 0.93 | 0.93 | 0.93 |
| Melt Flow Rate (g/10 minutes) | | | | 23.4 | 23.1 | 36.5 | 23.9 | 23.5 | 21.1 | 26.3 | 23.5 | 23.2 | 23.8 | 23.3 |
| Flexural Modulus (kg/cm$^2$) | | | | 22300 | 20500 | 22400 | 21400 | 23100 | 22300 | 22200 | 22600 | 22300 | 21500 | 22000 |
| 23° C. Izod (kg · cm/cm) | | | | 6.1 | 6.2 | 4.8 | 8.3 | 4.1 | 5.3 | 5.2 | 5.1 | 6.2 | 5.0 | 5.2 |
| −30° C. Dupont Impact @ 10 kg · m* (kg · cm/cm) | | | | N.B. | N.B. | B | N.B. | B | B | B | B | B | B | B |
| Heat Deflection Temperature (° C.) | | | | 131 | 125 | 132 | 127 | 133 | 131 | 131 | 132 | 131 | 130 | 131 |

*N.B. = (No Break), B = (Break)

As illustrated by Table 1, compositions having one or more properties with value deemed unacceptable were classified as comparative examples; those with all acceptable values were classified as examples of the invention. Table 1 also illustrates the differences between Example 1, a preferred composition, and Examples 2 and 4, other compositions of the invention. While all three examples gave satisfactory results for each of the property tests, Example 1 demonstrated superior properties for flexural modulus and heat deflection temperature.

We claim:

1. A thermoplastic resin composition, comprising:
   a. about 85 to about 95 weight % of a crystalline propylene ethylene block copolymer or of a combination of a crystalline propylene ethylene block copolymer and a polypropylene homoploymer, wherein
      i. said crystalline propylene ethylene block copolymer or said combination has a melt flow rate, measured at 230° C. under 2.16-kg load, ranging from about 20 to about 30 g/10 minutes,
      ii. the wt % of ethylene in said crystalline propylene ethylene block copolymer or said combination ranges from about 2.2 to about 4.2 wt %; and
      iii. said propylene homopolymer has an isotactic pentad fraction, measured by $^{13}$C-NMR, greater than or equal to about 94%
   b. about 2 to about 8 weight % of an ethylene butene rubber, wherein said ethylene butene rubber has
      i. a melt flow rate, measured at 230° C. under 2.16-kg load, ranging from about 5 to about 10 g/10 minutes, and
      ii. a density ranging from about 0.860 to about 0.865 g/cc; and
   c. about 2 to about 8 weight % of talc that has an average diameter ranging from about 1 to about 2 $\mu$m.

2. The thermoplastic resin composition of claim 1, wherein said isotactic pentad fraction is greater than or equal to about 97%.

3. The thermoplastic resin composition of claim 1, wherein said wt % of ethylene in said crystalline propylene ethylene block copolymer or said combination ranges from about 2.2 to about 3.2.

4. The thermoplastic resin composition of claim 1, wherein said ethylene butene rubber has a melt flow ranging from about 6 to about 8 g/10 minutes.

5. The thermoplastic resin composition of claim 1, wherein said ethylene butene rubber has a density ranging from about 0.861 to about 0.863 g/cc.

6. A molded thermoplastic article, comprising:
   a. about 85 to about 95 weight % of a crystalline propylene ethylene block copolymer or of a combination of a crystalline propylene ethylene block copolymer and a polypropylene homoploymer, wherein
      i. said crystalline propylene ethylene block copolymer or said combination has a melt flow rate, measured at 230° C. under 2.16-kg load, ranging from about 20 to about 30 g/10 minutes,
      ii. the wt % of ethylene in said crystalline propylene ethylene block copolymer or said combination ranges from about 2.2 to about 4.2 wt %; and
      iii. said propylene homopolymer has an isotactic pentad fraction, measured by $^{13}$C-NMR, greater than or equal to about 94%
   b. about 2 to about 8 weight % of an ethylene butene rubber, wherein said ethylene butene rubber has
      i. a melt flow rate, measured at 230° C. under 2.16-kg load, ranging from about 5 to about 10 g/10 minutes, and
      ii. a density ranging from about 0.860 to about 0.865 g/cc; and
   c. about 2 to about 8 weight % of talc that has an average diameter ranging from about 1 to about 2 $\mu$m.

7. The molded thermoplastic article of claim 6, wherein said isotactic pentad fraction is greater than or equal to about 97%.

8. The molded thermoplastic article of claim 6, wherein said wt % of ethylene in said crystalline propylene ethylene block copolymer or said combination ranges from about 2.2 to about 3.2.

9. The molded thermoplastic article of claim 6, wherein said ethylene butene rubber has a melt flow rate ranging from about 6 to about 8 g/10 minutes.

10. The molded thermoplastic article of claim 6, wherein said ethylene butene rubber has a density ranging from about 0.861 to about 0.863 g/cc.

11. The molded thermoplastic article of claim 6, wherein said molded thermoplastic article is an automotive interior part.

12. The molded thermoplastic article of claim 11, wherein said automotive interior part is selected from the group consisting of: tailgate lower, console, steering column cover, driver lower cover, column cover lower, column cover upper, side cover right, side cover left, center lower cover, center lower garnish, defroster duct, glove box, and duct outlet.

13. A process of preparing a molded thermoplastic resin composition, comprising:
   a. providing a thermoplastic resin composition comprising:

i. about 85 to about 95 weight % of a crystalline propylene ethylene block copolymer or of a combination of a crystalline propylene ethylene block copolymer and a polypropylene homoploymer, wherein
   (a) said crystalline propylene ethylene block copolymer or said combination has a melt flow rate, measured at 230° C. under 2.16-kg load, ranging from about 20 to about 30 g/10 minutes,
   (b) the wt % of ethylene in said crystalline propylene ethylene block copolymer or said combination ranges from about 2.2 to about 4.2 wt %; and
   (c) said propylene homopolymer has an isotactic pentad fraction, measured by $^{13}$C-NMR, greater than or equal to about 94%
ii. about 2 to about 8 weight % of an ethylene butene rubber, wherein said ethylene butene rubber has
   (a) a melt flow rate, measured at 230° C. under 2.16-kg load, ranging from about 5 to about 10 g/10 minutes, and
   (b) a density ranging from about 0.860 to about 0.865 g/cc; and
iii. about 2 to about 8 weight % of talc that has an average diameter ranging from about 1 to about 2 μm,
b. molding said thermoplastic resin composition into a molded thermoplastic resin.

14. The process according to claim 13, wherein said isotactic pentad fraction is greater than or equal to about 97%.

15. The process according to claim 13, wherein said wt % of ethylene in said crystalline propylene ethylene block copolymer or said combination ranges from about 2.2 to about 3.2.

16. The process according to claim 13, wherein said ethylene butene rubber has a melt flow rate ranging from about 6 to about 8 g/10 minutes.

17. The process according to claim 13, wherein said ethylene butene rubber has a density ranging from about 0.861 to about 0.863 g/cc.

18. The process according to claim 13, wherein said thermoplastic resin composition is prepared via a blending process.

19. The process according to claim 13, wherein said thermoplastic resin composition is molded via a method selected from the group consisting of: injection molding, extrusion molding, hollow molding, sheet molding, heat forming, rotational molding, and laminate molding.

20. The process according to claim 19, wherein said thermoplastic resin composition is molded via injection molding.

21. The composition of claim 1, wherein said thermoplastic resin composition has a density of less than 0.94 g/cc.

22. The article of claim 6, wherein said molded thermoplastic article has a density of less than 0.94 g/cc.

23. The process of claim 13, wherein said thermoplastic resin composition has a density of less than 0.94 g/cc.

* * * * *